United States Patent
Chen et al.

(10) Patent No.: US 12,307,560 B2
(45) Date of Patent: May 20, 2025

(54) SYSTEMS AND METHODS FOR PROCESSING MEDICAL IMAGES WITH INVERTIBLE NEURAL NETWORKS

(71) Applicant: Shanghai United Imaging Intelligence Co., Ltd., Shanghai (CN)

(72) Inventors: Zhang Chen, Cambridge, MA (US); Siyuan Dong, New Haven, CT (US); Shanhui Sun, Cambridge, MA (US); Xiao Chen, Cambridge, MA (US); Yikang Liu, Cambridge, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 321 days.

(21) Appl. No.: 17/891,668

(22) Filed: Aug. 19, 2022

(65) Prior Publication Data

US 2024/0062438 A1 Feb. 22, 2024

(51) Int. Cl.
*G06T 5/70* (2024.01)
*G06T 5/10* (2006.01)
*G06T 5/20* (2006.01)
*G06T 5/73* (2024.01)
(Continued)

(52) U.S. Cl.
CPC .............. *G06T 11/008* (2013.01); *G06T 5/10* (2013.01); *G06T 5/20* (2013.01); *G06T 5/70* (2024.01); *G06T 5/73* (2024.01); *G06T 7/0014* (2013.01); *G06T 2207/10088* (2013.01);
(Continued)

(58) Field of Classification Search
CPC . G06T 11/008; G06T 5/10; G06T 5/20; G06T 5/70; G06T 5/73; G06T 5/60; G06T 7/0014; G06T 2207/10088; G06T 2207/20081; G06T 2207/20084; G06T 2207/30008; G06T 3/4046; G06T 3/4053; G06N 3/04; G06N 3/08
See application file for complete search history.

(56) References Cited

U.S. PATENT DOCUMENTS

2020/0294287 A1* 9/2020 Schlemper ................ G06T 5/70
2021/0287780 A1* 9/2021 Korani .................... G06N 3/045
(Continued)

OTHER PUBLICATIONS

Zha et al, Invertible Attention, 2021, arXiv:2106.09003v2, pp. 1-19. (Year: 2021).*
(Continued)

*Primary Examiner* — Kathleen M Broughton
(74) *Attorney, Agent, or Firm* — Zhong Law, LLC (57) ABSTRACT

Described herein are systems, methods, and instrumentalities associated with using an invertible neural network to complete various medical imaging tasks. Unlike traditional neural networks that may learn to map input data (e.g., a blurry reconstructed MRI image) to ground truth (e.g., a fully-sampled MRI image), the invertible neural network may be trained to learn a mapping from the ground truth to the input data, and may subsequently apply an inverse of the mapping (e.g., at an inference time) to complete a medical imaging task. The medical imaging task may include, for example, MRI image reconstruction (e.g., to increase the sharpness of a reconstructed MRI image), image denoising, image super-resolution, and/or the like.

17 Claims, 6 Drawing Sheets

(51) Int. Cl.
*G06T 7/00* (2017.01)
*G06T 11/00* (2006.01)

(52) U.S. Cl.
CPC .............. *G06T 2207/20081* (2013.01); *G06T 2207/20084* (2013.01); *G06T 2207/30008* (2013.01)

(56) References Cited

U.S. PATENT DOCUMENTS

| | | | |
|---|---|---|---|
| 2023/0079353 A1* | 3/2023 | Mailhe .................. | G06T 5/70 382/128 |
| 2024/0062047 A1* | 2/2024 | Chen .................... | G06N 3/084 |

OTHER PUBLICATIONS

Kelkar et al, Compressible Latent-Space Invertible Networks for Generative Model-Constrained Image Reconstruction, 2020, IEEE Transactions on Computational Imaging, pp. 1-27. (Year: 2020).*
Dong et al, Invertible Sharpening Network for MRI Reconstruction Enhancement, 2022, arXiv: 2206.02838v1, pp. 1-13. (Year: 2022).*
Ardizzone et al, Analyzing Inverse Problems with Invertible Neural Networks, 2019, arXiv: 1808.04730v3, pp. 1-20. (Year: 2019).*
Varun A. Kelkar, Compressible Latent-Space Invertible Networks for Generative Model-Constrained Image Reconstruction, Jul. 2020.
Patrick Putzky, Invert to Learn to Invert, Nov. 2019.
Patrick Putzky, i-RIM applied to the fastMRI challenge, Oct. 2019.

* cited by examiner

SYSTEMS AND METHODS FOR PROCESSING MEDICAL IMAGES WITH INVERTIBLE NEURAL NETWORKS

BACKGROUND

Medical imaging such as magnetic resonance imaging (MRI) plays an important role in disease detection and treatment, and recent years have seen an increasing use of machine learning (ML) technologies for generating and/or improving the quality of medical images. While these ML technologies have achieved impressive results, images obtained using these technologies still suffer from blurriness, loss of details, a high level of noise, and other shortcomings. Accordingly, new or modified neural network structures, ML models, and/or training techniques may be desirable to further improve the quality of medical imaging, for example, in the areas of image reconstruction, super-resolution, denoising, etc.

SUMMARY

Described herein are systems, methods, and instrumentalities associated with using an invertible neural network (INN) to generate and/or refine medical images such as MRI images. An apparatus configured to perform these tasks may include one or more processors that may be configured to obtain a first medical image of an anatomical structure, and process the first medical image of the anatomical structure through the INN to obtain a second medical image of the anatomical structure that may include one or more improvements to the first medical image. The one or more improvements may be related to, for example, a sharpness of the second medical image, a resolution of the second medical image, and/or an amount of noise in the second medical image. The INN may be trained to learn a mapping function through training and then, during the processing of the first medical image, maps the first medical image to the second medical image based on an inverse of the mapping function learned through the training. Once obtained, the second medical image of the anatomical structure may be stored (e.g., on a storage device of the apparatus or a cloud storage area) or transmitted (e.g., to a receiving device) to be used in one or more downstream tasks.

In examples, the INN may include an invertible residual network comprising multiple convolution layers, and a constraint (e.g., a smoothness or continuity constraint) may be imposed upon the multiple convolution layers to limit an amount of change that may occur at an output of the invertible residual network in response to an amount of change that occurs at an input of the invertible residual network (e.g., to ensure that a prediction made at an inference time may approximate an input used to train the neural network). Such a constraint may be imposed, for example, through a Lipschitz constant.

In examples, the first medical image processed by the INN may include an MRI image reconstructed based on under-sampled MRI data, and the mapping function learned by the INN through training may be for mapping a fully-sampled MRI image to a latent space representation of a known probability distribution (e.g., a Gaussian distribution) based on a reconstructed MRI image. For instance, during the training of the INN, the network may be configured to obtain a fully-sampled MRI training image and a reconstructed MRI training image, wherein the fully-sampled MRI training image may belong to a training dataset of fully-sampled MRI images and the reconstructed MRI training image may be generated based on under-sampled MRI training data to approximate the fully-sampled MRI training image. Based on the fully-sampled MRI training image and the reconstructed MRI training image, the INN may predict a latent space that may represent the known probability distribution such as a unit Gaussian distribution. The INN may further determine a loss associated with the prediction by comparing the estimated probability distribution with a ground truth, and the INN may adjust one or more of its parameters based on the determined loss. Subsequently, when processing of the first medical image, a latent variable may be sampled from the latent space learned by the INN through the training, and the inverse of the mapping function learned from the training may be applied to the first medical image such that the second medical image obtained through the processing may follow (e.g., approximately) the probability distribution of fully-sampled MRI images.

In examples, the first medical image may include an MRI image reconstructed based on under-sampled MRI data, and the mapping function learned by the INN through training may be for mapping a fully-sampled MRI image to a reconstructed MRI image. For instance, during the training of the INN, the INN may be configured to obtain a fully-sampled MRI training image that may correspond to a set of fully-sampled MRI data, and the INN may predict, based on the fully-sampled MRI training image, an MRI image that may correspond to a reconstruction of a set of under-sampled MRI data. The INN may further determine a loss associated with the prediction by comparing the predicted MRI image with a ground truth image reconstructed from the set of under-sampled MRI data, and the INN may adjust one or more of its parameters based on the determined loss. Subsequently, when processing of the first medical image, the inverse of the mapping function learned from the training may be applied to the first medical image such that the second medical image obtained through the processing may have an improved quality (e.g., increased sharpness) compared to the first medical image.

In examples, the first medical image described herein may be generated based on under-sampled MRI data from an MRI data space (e.g., a k-space), and a data consistency (DC) layer or component may be used (e.g., as part of the INN or together with the INN) to ensure that the second medical image obtained based on the first medical image is consistent with the actual measurements of the k-space. For instance, the DC layer or component may be configured to determine MRI data corresponding to a preliminary MRI image predicted by the INN, update at least a part of the MRI data based on actual under-sampled MRI data obtained from the k-space, and generate the second medical image based on the updated MRI data. The MRI data corresponding to the preliminary MRI image may be determined, for example, by applying a Fourier transform to the preliminary MRI image, and the second medical image may be obtained by applying an inverse Fourier transform to the updated MRI data.

BRIEF DESCRIPTION OF THE DRAWINGS

A more detailed understanding of the examples disclosed herein may be had from the following description, given by way of example in conjunction with the accompanying drawing.

DETAILED DESCRIPTION

Performing medical imaging tasks such as image reconstruction, super-resolution, and/or denoising may be analogous to solving an inverse problem. This may be because, for example, these tasks may all aim at recovering an ideal medical image (e.g., a fully-sampled MRI image, a high resolution image, a noise-free image, etc.) based on an actually observed medical image (e.g., an under-sampled MRI image, a low resolution image, a noisy image, etc.), which may be the inverse of a lossy forward process for obtaining an observed medical image based on an ideal medical image. Conventional deep learning (DL) based medical imaging techniques may focus on training a neural network to learn the inverse mapping (e.g., from an observed medical image to an ideal or ground truth medical image), but the quality of the images generated using these techniques are often sub-optimal (e.g., blurry) since, for example, MRI reconstruction based on under-sampled data may be an ill-posed problem since one under-sampled image may correspond to multiple possible fully-sampled images, loss functions used during network training may result in a pixel-wise average or median of multiple possible solutions, which in turn may lead to over-smoothing of areas that should have been be rich in high-frequency details, etc. Accordingly, embodiments of the present disclosure contemplate using alternative neural network structures, ML models, and/or training techniques to improve the quality of medical imaging and employing these neural network structures, ML model, and/or training techniques in various medical imaging tasks including, e.g., image reconstruction (e.g., from under-sampled images to fully-sampled images), image sharpening (e.g., increase the sharpness of an image), super-resolution (e.g., increasing the resolution or level of details of an image), denoising (e.g., reducing the amount of noise in an image), etc.

Figure 1:
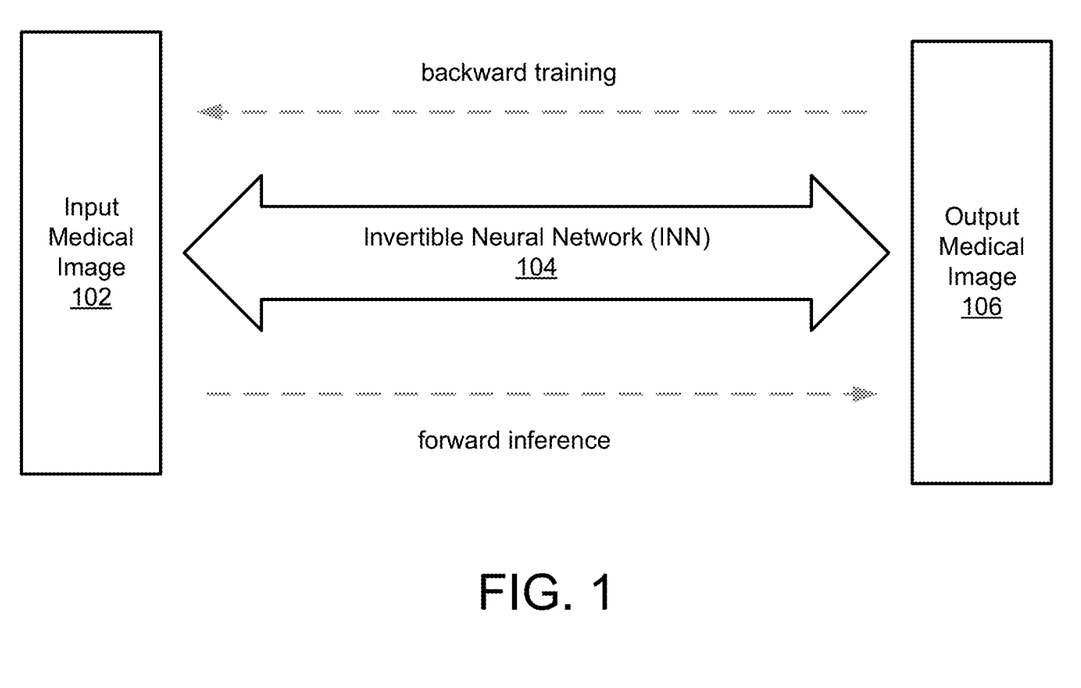
FIG. 1 is a simplified block diagram illustrating an example of generating and/or refining a medical image using an invertible neural network (INN) in accordance with one or more embodiments describe herein.

FIG. 1 illustrates an example of refining a medical image using an invertible neural network (INN). When described herein, an INN may refer to an artificial neural network capable of performing both a forward mapping (e.g., from an input to an output) and a backward mapping (e.g., from an output to an input), where the mappings may be bijective, efficiently computable, and/or tractable (e.g., either or both of the mappings may have a tractable Jacobian that may allow explicit computation of posterior probabilities). The structure of such an INN may be designed to be reversible (e.g., the forward mapping or pass may be the exact or approximate inverse of the backward mapping or pass) and, as such, the INN may be inherently suitable for solving the inverse problem associated with the medical imaging tasks described herein. For example, as shown in FIG. 1, a first medical image 102 of an anatomical structure (e.g., a knee, a brain, a heart, etc.) may be obtained through an imaging modality such as an MRI scan, a computerized tomography (CT) scan, an X-Ray scan, etc. Due to various environmental, mechanical, and/or computational limitations, the quality of medical image 102 may be sub-optimal and may need to be improved before being used in clinical practice. An INN 104 may be used to accomplish the improvement. For instance, INN 104 (e.g., an instance of INN 104) may be trained to learn a mapping function for mapping an ideal or desirable medical image (e.g., a fully-sampled medical image, a high resolution and/or low noise medical image, etc.) to an imperfect medical image (e.g., a medical image reconstructed from under-sampled data, a low resolution and/or high noise medical image, etc.) through a backward training process. Then, at an inference time and in response to receiving medical image 102 as an input, INN 104 may map medical image 102 to a second medical image 106 based on an inverse of the mapping function learned by the INN through training. Since the training of INN 104 may be conducted using ideal or desirable medical images, and the forward and backward operations of INN 104 may be exactly or approximately the inverse of each other, medical image 106 may be characterized by improved quality (e.g., over medical image 104) with respect to at least one of a sharpness of the image, a resolution of the image, or an amount of noise in the image. The medical image 106 generated using the INN 104 may then be saved (e.g., locally or in a cloud) or transmitted (e.g., to a receiving device), e.g., for one or more downstream tasks.

It should be noted here that the forward and backward directions or passes described herein are not absolute directions or passes, but are relative to each other (e.g., two opposite directions respectively associated with training and inference). Accordingly, backward training and forward inference may also be referred to as forward training and backward inference.

In examples, medical image 102 may include a reconstructed MRI image (e.g., a two-dimensional or three-dimensional MRI image) generated based on under-sampled MRI data such as under-sampled spatial, frequency, and/or phase data collected by an MRI scanner (e.g., the relevant data may be referred to herein as a k-space or k-space information). The reconstruction may be performed using an MRI image reconstruction neural network, for example, by converting the under-sampled MRI data into an under-sampled MRI image (e.g., via inverse fast Fourier transform (IFFT)), extracting features from the under-sampled MRI image, and predicting a refined MRI image (e.g., medical image 102) based on the extracted features. The reconstructed MRI image (e.g., medical image 102) may then be further processed through INN 104 to improve at least the sharpness of the resulting image (e.g., medical image 106).

It should be noted that even though embodiments of the present disclosure may be described using MRI reconstruction as an example, those skilled in the art will appreciate that the techniques disclosed herein may also be used to accomplish other medical imaging tasks such as super-resolution, denoising, etc.

Figure 2:
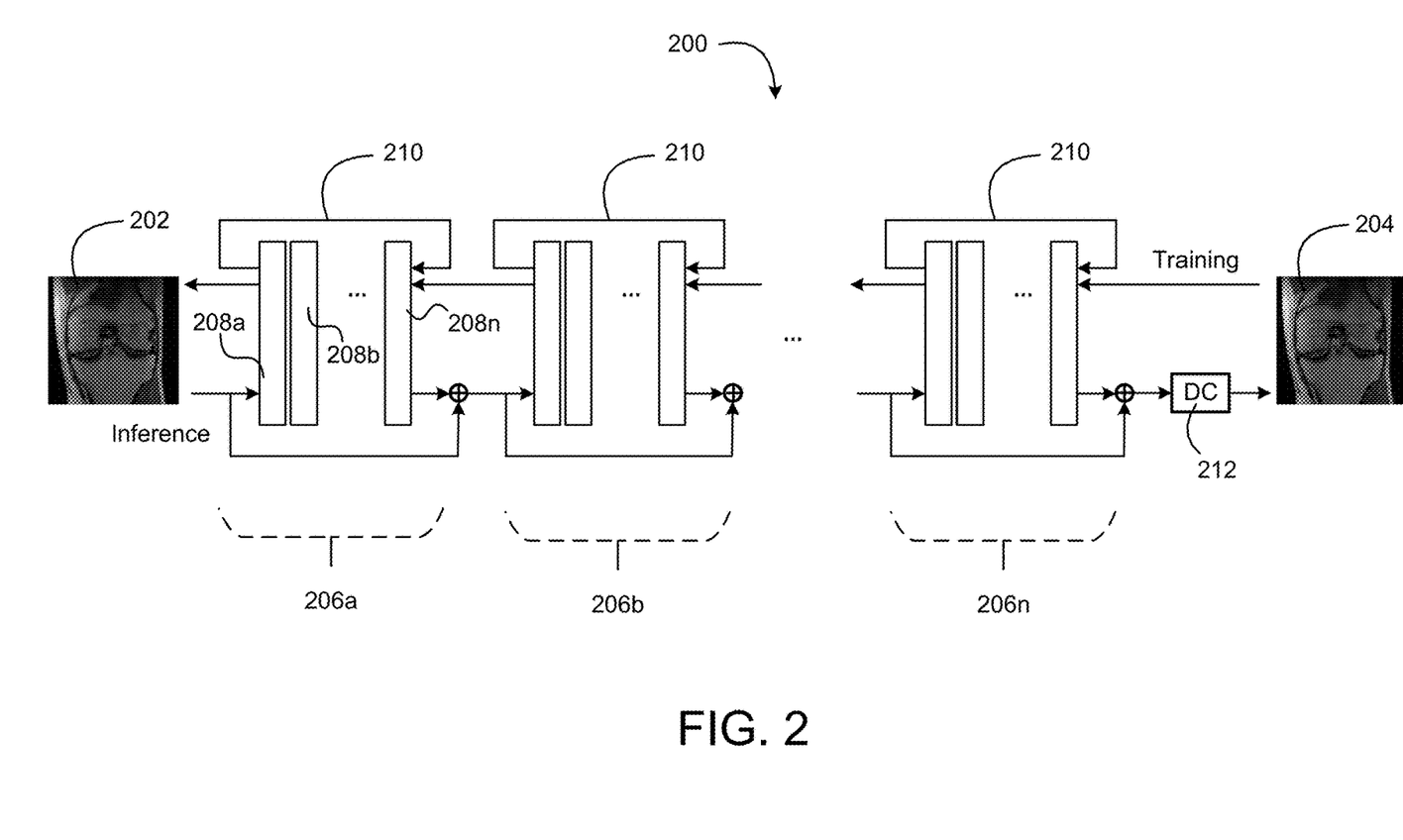
FIG. 2 is a simplified block diagram illustrating an example architecture of an INN in accordance with one or more embodiments described herein.

FIG. 2 illustrates an example architecture of an invertible neural network 200 (e.g., INN 104 of FIG. 1) that may be used in one or more embodiments of the present disclosure. As shown, INN 200 may differ from a conventional neural network at least in that INN 200 may be trained to learn a mapping from a ground truth (GT) MRI image (e.g., a fully-sampled and sharp MRI image) to an input MRI image (e.g., a reconstructed and blurry MRI image), and then, when given an imperfect MRI image 202 such as a blurry reconstructed MRI image at an inference time, the INN may generate an improved MRI image 204 based on the inverse of the mapping learned by the INN such that MRI image 204 may approximate the ground truth MRI image used as an input during training. In other words, the training of INN 200 may be conducted in a backward direction (e.g., from the ground truth image to the input image) while an inference may be performed in a forward direction (e.g., from image 202 to image 204). This way, a one-to-one mapping between an imperfect (e.g., blurry) image and an ideal (e.g., sharpened) image may be learned leveraging the INN's invertibility to overcome the shortcomings (e.g., over-smoothing resulted from using pixel-wise losses) of conventional neural networks.

In examples, INN 200 may include a invertible residual network comprising multiple convolution blocks (e.g., 206a, 206b . . . 206n), and each of the convolution blocks may include multiple convolutional layers (e.g., 208a, 208b . . . 208n). The convolution blocks may be constructed as residual blocks having skip connections, through which the output of a previous block may be added to the output of the block after it (e.g., a characteristic of the residual network). The convolutional layers may each include a plurality of convolution kernels or filters having respective weights (e.g., corresponding to parameters of the ML model learned by the neural network) that may be configured to extract features from an input. The convolution operations of each convolutional layer may be followed by batch normalization and/or an activation function (e.g., such as a rectified linear unit (ReLu) activation function), and the features extracted by the convolutional layers may be represented by a feature map or a feature vector. In examples, a smoothness or continuity constraint may be imposed on one or more convolutional layers of the invertible residual network to limit an amount of change that may occur at an output of the network in response to an amount of change that may occur at an input of the network. In examples, such a smoothness constraint may be implemented (e.g., based on) using a Lipschitz constant, which may be given a value of less than 1 (e.g., greater than 0 and smaller than 1) to achieve full (e.g., approximately full) invertibility. And the inverse of an operation may be computed through one or more fixed-point iterations 210. Hence, given the output of each convolution block, an corresponding input may be determined by iteratively looping through the block. A smaller Lipschitz constant (e.g., 0.5) may result in fewer iterations being performed to guarantee full invertibility, but may negatively affect the network's learning capabilities. On the other hand, a larger Lipschitz constant (e.g., 0.9) may improve the learning capabilities of the network, but may lead to more iterations being performed to compute an inverse. A trade-off between the learning capabilities and training time may be accomplished by manipulating the value of the Lipschitz constant and the number of iterations to be performed. For instance, the value of the Lipschitz constant may be set to 0.7 and the number of iterations may be set of 2 in some examples to achieve a balance between the learning capabilities and the training time.

In examples, the mapping from a fully-sampled MRI image (e.g., a ground truth image) to a reconstructed MRI image may depend on a sampling mask used to sub-sample the k-space. To learn such a mapping, the ground truth image may be concatenated with an under-sampled image and used as an input during the training of INN 200. Since the under-sampled image may be generated based on the sampling mask, the under-sampled image may provide information about the sampling mask to the network. And to maintain a same dimensionality on the input and output of the network (e.g., as a characteristic of an invertible neural network), INN 200 may be configured to output two images, both of which may be optimized to minimize a difference (e.g., a mean squared error (MSE) or a mean absolute error (MAE)) between the output image and a target reconstructed image. During inference, duplicates (e.g., two duplicates) of image 202 may be provided as inputs to INN 200 in the forward direction, and image 204 may be generated at the output of the network as an improvement (e.g., in terms of sharpness) to image 202.

In examples, a data consistency (DC) layer or component 212 may be used (e.g., as part of INN 200 or an appendix to the output of INN 200 in the forward direction) to ensure that image 204 predicted by the network is consistent with the actual measurements obtained from a corresponding k-space. For instance, as part of the forward inference operation, INN 200 may be configured to predict a preliminary MRI image, and DC layer 212 may be configured to convert the preliminary image predicted by INN 200 into corresponding k-space data (e.g., by applying a fast Fourier transform (FFT) to the preliminary image), update (e.g., replace or modify) certain parts or components of the k-space data with real measurements of the k-space (e.g., the under-sampled MRI data used to generate image 202), and convert the updated k-space data back into the image domain (e.g., via an iFFT) to obtain image 204. It should be noted that, although not shown in FIG. 2, the training of INN 200 may also involve the use of a DC layer as described above.

Figure 3A:
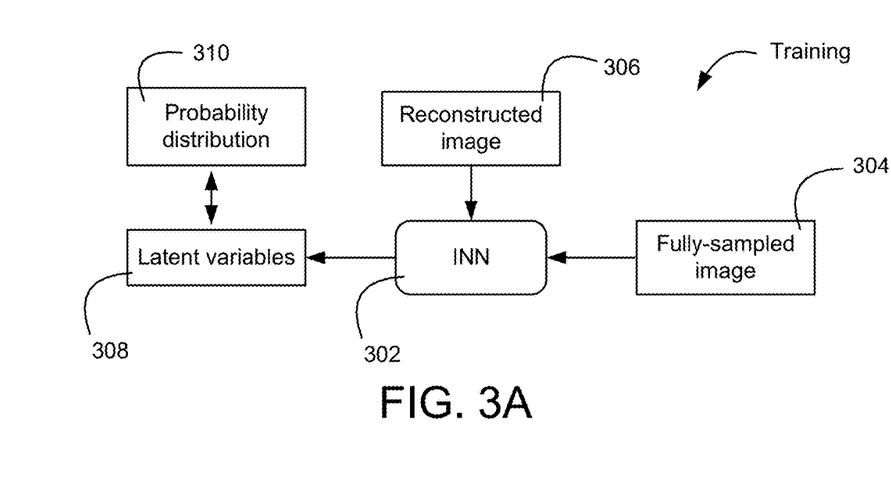
FIGS. 3A and 3B are simplified block diagrams illustrating examples of training an INN in a backward direction and using the trained INN to perform a prediction in a forward direction during inference in accordance with one or more embodiments described herein.
Figure 3B:
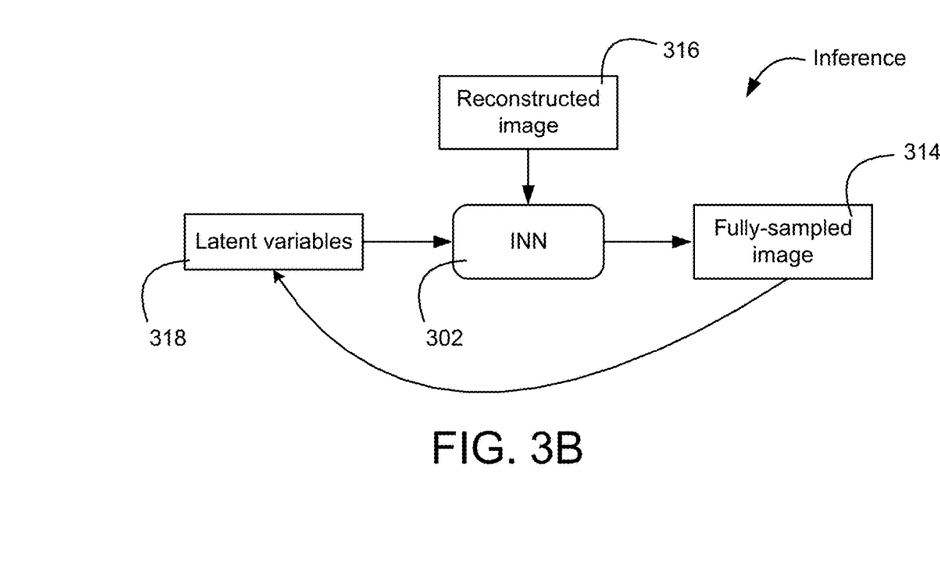

FIG. 3A illustrates an example of training an INN 302 in a backward direction to learn a mapping, and FIG. 3B illustrates an example of using the trained INN 302 to perform a medical imaging task in a forward direction based on an inverse of the learned mapping. In the example shown in FIG. 3A, the mapping learned by INN 302 through training may be for mapping an ideal medical image (e.g., a fully-sampled MRI image) to a latent space that may represent a known probability distribution such as a unit Gaussian distribution. For instance, during the training, INN 302 (e.g., an instance of INN 302) may be configured to receive, as a first input, a fully-sampled MRI training image 304 from a training dataset, and further receive, as a second input, a reconstructed MRI training image 306 that may be generated based on under-sampled MRI data (e.g., reconstructed MRI image 306 may be a blurry approximation of the fully-sampled MRI training image 304). INN 302 may process the fully-sampled MRI image 304 and the reconstructed MRI image 306 through the neural network, and may predict the latent space 308 at an output of the neural network (e.g., the reconstructed MRI image 306 may operate to constrain or condition the prediction made by INN 302). INN 302 may then compare the estimated probability distribution represented by latent space 308 with a ground truth probability distribution 310 (e.g., a unit Gaussian distribution) to determine a loss associated with the prediction, and use the loss (e.g., a gradient descent of the loss) to adjust the parameters of the neural network. Since the loss used to guide the training may not involve a pixel-wise comparison of the reconstructed image 306 and the fully-sampled image 304, the potential over-smoothing problem discussed herein may be circumvented.

Once trained, INN 302 may be used to predict a fully-sampled MRI image 314 (e.g., a sharped reconstructed MRI image) based on a blurry reconstructed MRI image 316 and a latent variable 318 (e.g., sampled from the latent space learned through training). The fully-sampled MRI image 314 may be predicted by applying the inverse of the mapping learned through the training process. The reconstructed MRI image 316 may be provided as an input to INN 302 through a coupling layer (e.g., an affine coupling layer), and a change-of-variables approach (e.g., replacing an original variable with functions of other variables) may be adopted to maximize the likelihood that image 314 may be generated with the desired quality (e.g., following, at least approximately, a probability distribution of fully-sampled MRI images).

Figure 4A:
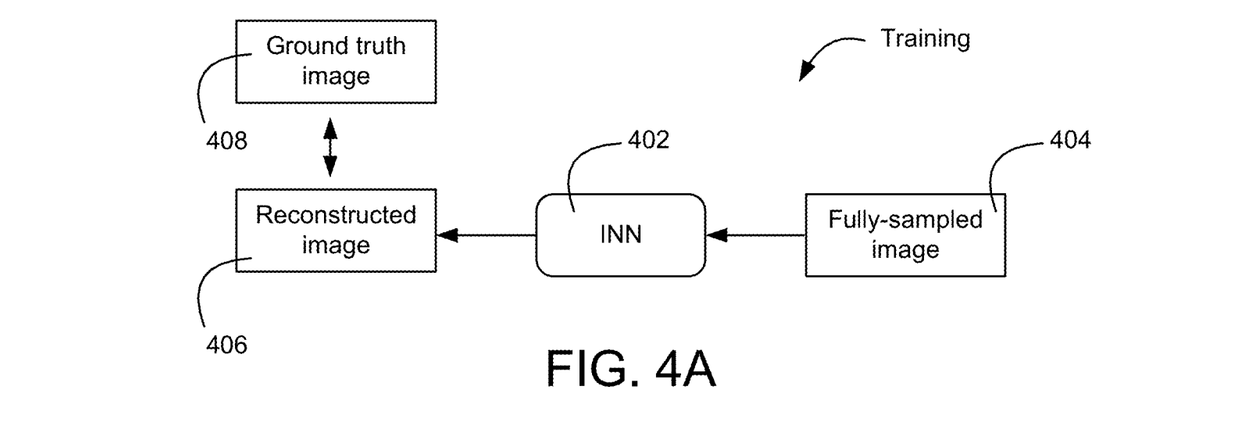
FIGS. 4A and 4B are simplified block diagrams illustrating examples of training an INN in a backward direction and using the trained INN to perform a prediction in a forward direction during inference in accordance with one or more embodiments described herein.
Figure 4B:
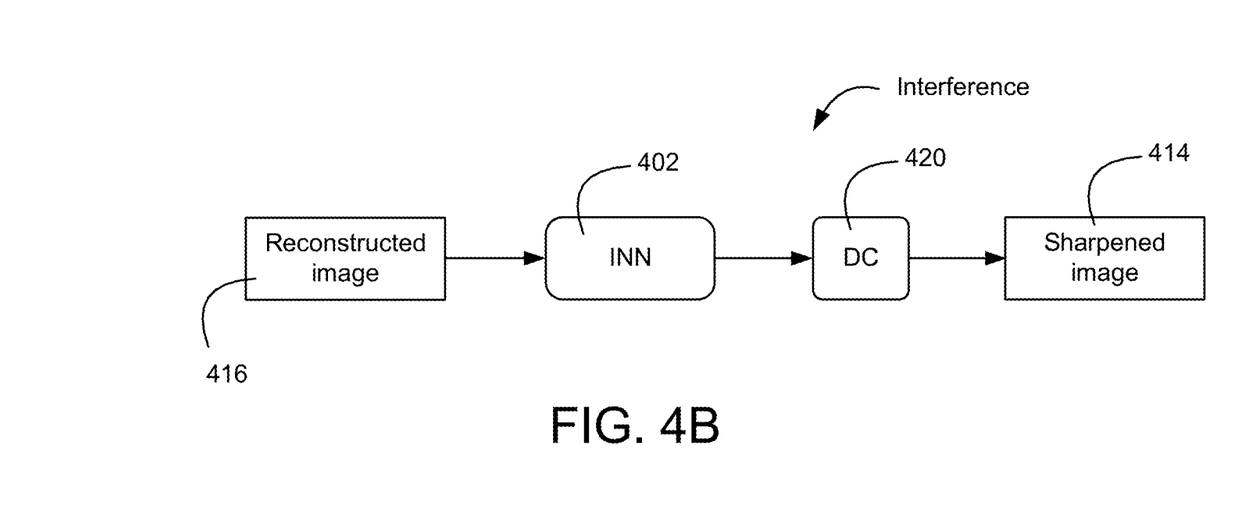

FIG. 4A illustrates another example of training an INN 402 in a backward direction to learn a mapping, and FIG. 4B illustrates an example of using the trained INN 402 to perform a medical imaging task in a forward direction based on an inverse of the learned mapping. In the example shown in FIG. 4A, INN 402 may be trained to learn a mapping from an ideal medical image (e.g., a fully-sampled MRI image) to an imperfect medical image (e.g., a blurry reconstructed MRI image). For instance, during the training, INN 402 (e.g., an instance of INN 402) may be configured to receive, as an input, a fully-sampled MRI training image 404 from a training dataset, and process the fully-sampled MRI image 404 through the convolution layers of the neural network to predict, at an output of the neural network, a reconstructed MRI training image 406 generated based on under-sampled MRI data (e.g., image 406 may be a blurry approximation of image 404). INN 402 may then compare the predicted MRI image 406 with a ground truth image 408 to determine a loss associated with the prediction, and use the loss (e.g., a gradient descent of the loss) to adjust the parameters of the neural network. The loss may be determined, for example, based on a pixel-wise mean absolute error (MAE) or mean squared error (MSE) between the predicted image 406 and the ground truth image 408.

Once trained, INN 402 may be used to predict a fully-sampled MRI image 414 (e.g., a sharped reconstructed MRI image) based on a blurry reconstructed MRI image 416, by applying the inverse of the mapping learned through the training process described above. A DC layer 420 may be included (e.g., as part of INN 402 or an appendix to the output of INN 402) to ensure that image 414 is consistent with actual measurements (e.g., under-sampled MRI data) used to generate the reconstructed image 416.

Figure 5:
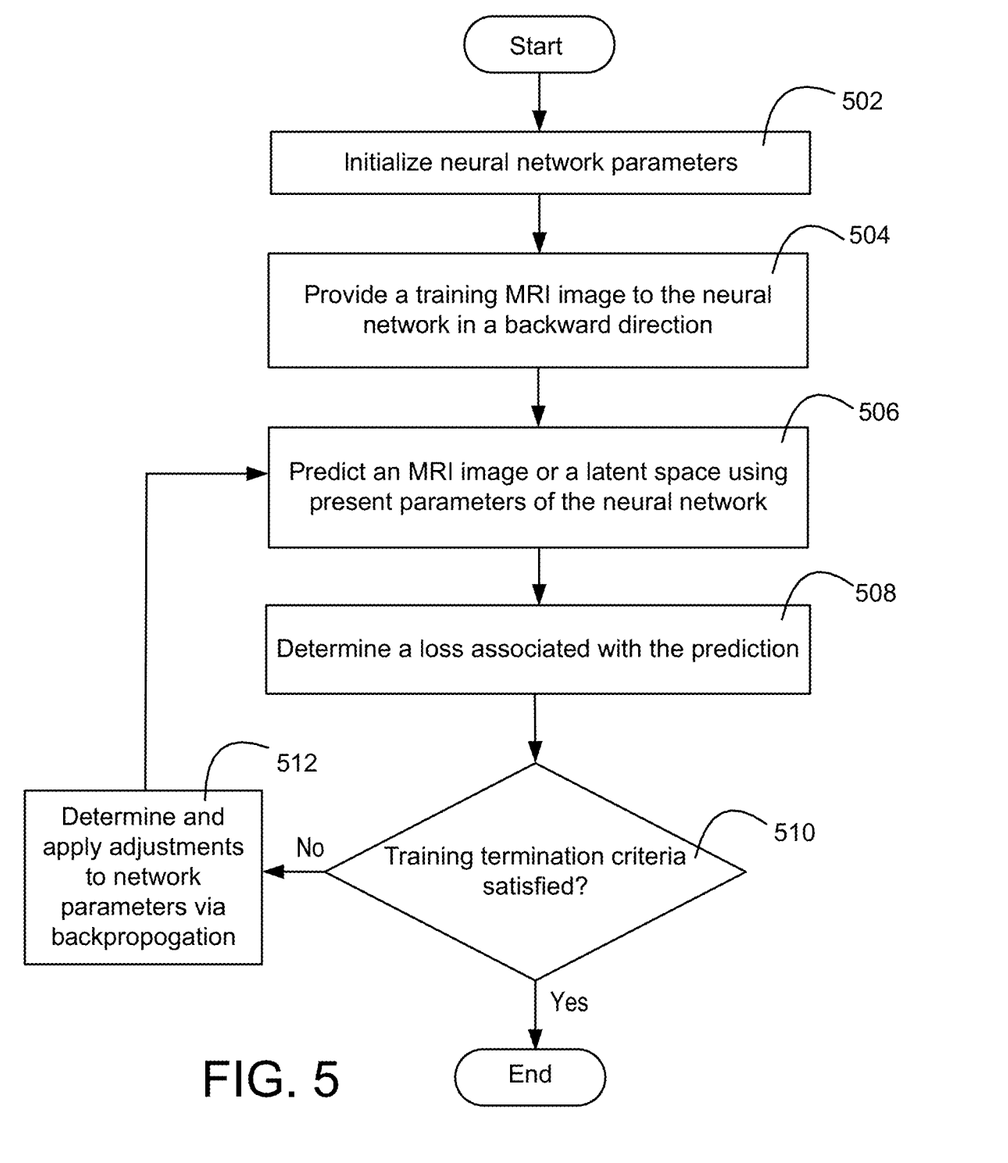
FIG. 5 is a flow diagram illustrating an example process for training an artificial neural network such as an INN to perform the medical image generation and/or refinement tasks described herein.

FIG. 5 illustrates an example process for training an artificial neural network (e.g., the INN described herein) to perform the medical image refinement tasks described herein. As shown, the training process may include initializing parameters of the neural network (e.g., weights associated with the various filters or kernels of the neural network) at 502, for example, based on samples from one or more probability distributions or parameter values of another neural network having a similar architecture. The training process may further include providing an MRI training image (e.g., a fully-sampled MRI image) to the neural network in a backward direction at 504, and causing the neural network to predict, using present parameters of the network, an MRI image or a latent space at 506. Subsequently, at 508, a loss associated with the prediction may be determined based on the predicted MRI image or latent space and a corresponding ground truth. Once determined, the loss may be evaluated at 510 to determine whether one or more training termination criteria have been satisfied. For example, a training termination criterion may be deemed satisfied if the loss(es) described above is below a predetermined thresholds, if a change in the loss(es) between two training iterations (e.g., between consecutive training iterations) falls below a predetermined threshold, etc. If the determination at 510 is that a training termination criterion has been satisfied, the training may end. Otherwise, the loss may be backpropagated through the neural network (e.g., based on a gradient descent associated with the loss) at 512 before the training returns to 506.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 6:
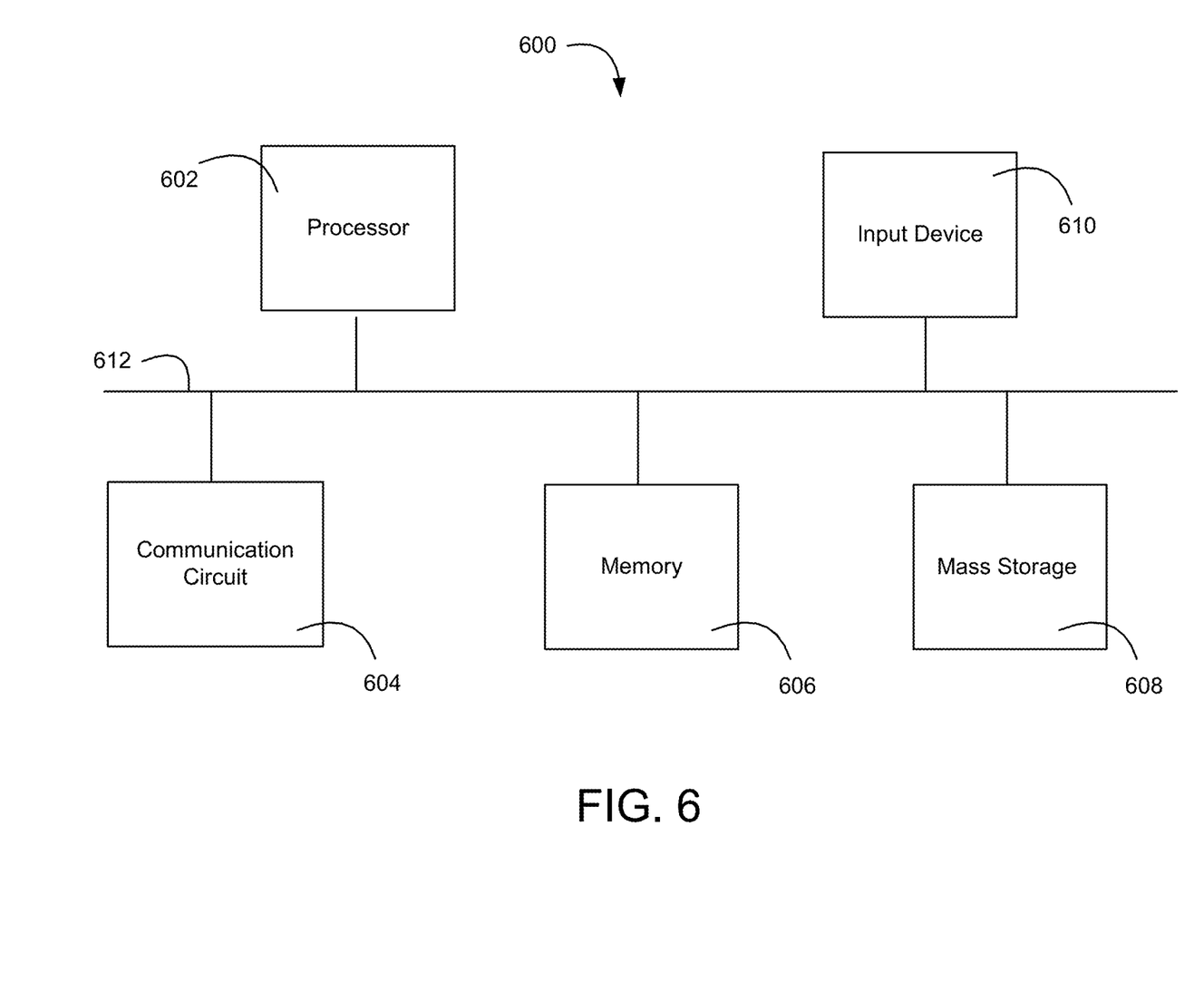
FIG. 6 is a simplified block diagram illustrating example components of an apparatus that may be configured to perform the medical image generation and/or refinement tasks described here.

The systems, methods, and/or instrumentalities described herein may be implemented using one or more processors, one or more storage devices, and/or other suitable accessory devices such as display devices, communication devices, input/output devices, etc. FIG. 6 is a block diagram illustrating an example apparatus 600 that may be configured to perform the medical image refinement tasks described herein. As shown, apparatus 600 may include a processor (e.g., one or more processors) 602, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 600 may further include a communication circuit 604, a memory 606, a mass storage device 608, an input device 610, and/or a communication link 612 (e.g., a communication bus) over which the one or more components shown in the figure may exchange information.

Communication circuit 604 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 606 may include a storage medium (e.g., a non-transitory storage medium) configured to store machine-readable instructions that, when executed, cause processor 602 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 608 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 602. Input device 610 may include a keyboard, a mouse, a voice-controlled input device, a touch sensitive input device (e.g., a touch screen), and/or the like for receiving user inputs to apparatus 600.

It should be noted that apparatus 600 may operate as a standalone device or may be connected (e.g., networked, or clustered) with other computation devices to perform the functions described herein. And even though only one instance of each component is shown in FIG. 6, a skilled person in the art will understand that apparatus 600 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
   one or more processors configured to:
   obtain a reconstructed medical image of an anatomical structure based on under-sampled medical data collected from a medical data space;
   process the reconstructed medical image of the anatomical structure through an invertible neural network (INN) to derive a refined medical image of the anatomical structure, wherein the refined medical image includes an improvement to the reconstructed medical image with respect to at least one of a sharpness of the refined medical image, a resolution of the refined medical image, or an amount of noise in the refined medical image, wherein the INN is pre-trained to learn a mapping from the refined medical image to the reconstructed medical image, and wherein, during the derivation of the refined medical image, the one or more processors are configured to:
   generate a preliminary medical image based on the reconstructed medical image and an inverse of the mapping learned by the INN;
   convert the preliminary medical image into medical data in the medical data space;
   update at least a portion of the medical data based on the under-sampled medical data; and
   generate the refined medical image based on the updated medical data; and
   store or transmit the refined medical image.

2. The apparatus of claim 1, wherein the INN includes an invertible residual network.

3. The apparatus of claim 2, wherein the invertible residual network includes multiple convolution layers and wherein a constraint is imposed upon the multiple convolution layers to limit an amount of change that occurs at an output of the invertible residual network in response to an amount of change that occurs at an input of the invertible residual network.

4. The apparatus of claim 3, wherein the constraint is imposed through a Lipschitz constant.

5. The apparatus of claim 1, wherein the reconstructed medical image includes a magnetic resonance imaging (MRI) image reconstructed based on under-sampled MRI data, wherein the mapping learned by the INN is for mapping a fully-sampled MRI image to a latent space representation of a known probability distribution of the MRI image, and wherein, during the processing of the reconstructed medical image, the inverse of the learned mapping is applied to the reconstructed medical image such that the refined medical image derived through the processing approximately follows a probability distribution of the fully-sampled MRI image.

6. The apparatus of claim 5, wherein the known probability distribution is a Gaussian distribution.

7. The apparatus of claim 5, wherein the mapping is learned by the INN through a training process during which the INN is configured to:
   obtain a fully-sampled MRI training image and a reconstructed MRI training image, wherein the fully-sampled MRI training image belongs to a training dataset of fully-sampled MRI images and the reconstructed MRI training image is generated based on under-sampled MRI training data to approximate the fully-sampled MRI training image;
   determine, based on the fully-sampled MRI training image and the reconstructed MRI training image, an estimated latent space representing the known probability distribution;
   determine a loss based on the estimated latent space and a ground truth; and
   adjust one or more parameters of the INN based on the determined loss.

8. The apparatus of claim 1, wherein the reconstructed medical image includes an magnetic resonance imaging (MRI) image reconstructed based on under-sampled MRI data, wherein the mapping learned by the INN is for mapping a fully-sampled MRI image to a reconstructed MRI image, and wherein, during the processing of the reconstructed medical image, the inverse of the learned mapping is applied to the reconstructed medical image such that the refined medical image derived through the processing has an increased sharpness compared to the reconstructed medical image.

9. The apparatus of claim 8, wherein the mapping is learned by the INN through a training process during which the INN is configured to:
   obtain a fully-sampled MRI training image;
   predict, based on the fully-sampled MRI training image, an MRI image that corresponds to a reconstruction of under-sampled MRI training data;
   determine a loss between the predicted MRI image and a ground truth image reconstructed from the under-sampled MRI training data; and
   adjust one or more parameters of the INN based on the determined loss.

10. A method, comprising:
    obtaining a reconstructed medical image of an anatomical structure based on under-sampled medical data collected from a medical data space;
    processing the reconstructed medical image of the anatomical structure through an invertible neural network (INN) to derive a refined medical image of the anatomical structure, wherein the refined medical image includes an improvement to the reconstructed medical image with respect to at least one of a sharpness of the refined medical image, a resolution of the refined medical image, or an amount of noise in the refined medical image, wherein the INN is pre-trained to learn a mapping from the refined medical image to the reconstructed medical image, and wherein the derivation of the refined medical image comprises:
- generating a preliminary medical image based on the reconstructed medical image and an inverse of the mapping learned by the INN;
- converting the preliminary medical image into medical data in the medical data space;
- updating at least a portion of the medical data based on the under-sampled medical data; and
- generating the refined medical image based on the updated medical data; and storing or transmitting the refined medical image.

11. The method of claim 10, wherein the INN includes an invertible residual network.

12. The method of claim 11, wherein the invertible residual network includes multiple convolution layers and wherein a constraint is imposed upon the multiple convolution layers to limit an amount of change that occurs at an output of the invertible residual network in response to an amount of change that occurs at an input of the invertible residual network.

13. The method of claim 12, wherein the constraint is imposed through a Lipschitz constant.

14. The method of claim 10, wherein the reconstructed first medical image includes a magnetic resonance imaging (MRI) image reconstructed based on under-sampled MRI data, wherein the mapping learned by the INN is for mapping a fully-sampled MRI image to a latent space representation of a known probability distribution of the MRI image, and wherein, during the processing of the reconstructed medical image, the inverse of the learned mapping is applied to the reconstructed medical image such that the refined medical image derived through the processing approximately follows a probability distribution of the fully-sampled MRI image.

15. The method of claim 14, wherein the mapping is learned by the INN through a training process during which the INN is configured to:
- obtain a fully-sampled MRI training image and a reconstructed MRI training image, wherein the fully-sampled MRI training image belongs to a training dataset of fully-sampled MRI images and the reconstructed MRI training image is generated based on under-sampled MRI training data to approximate the fully-sampled MRI training image;
- determine, based on the fully-sampled MRI training image and the reconstructed MRI training image, an estimated latent space representing the known probability distribution;
- determine a loss based on the estimated latent space and a ground truth; and
- adjust one or more parameters of the INN based on the determined loss.

16. The method of claim 10, wherein the reconstructed medical image includes an magnetic resonance imaging (MRI) image reconstructed based on under-sampled MRI data, wherein the mapping learned by the INN is for mapping a fully-sampled MRI image to a reconstructed MRI image, and wherein, during the processing of the reconstructed medical image, the inverse of the learned mapping is applied to the reconstructed medical image such that the refined medical image derived through the processing has an increased sharpness compared to the reconstructed medical image.

17. The method of claim 16, wherein the mapping is learned by the INN through a training process during which the INN is configured to:
- obtain a fully-sampled MRI training image;
- predict, based on the fully-sampled MRI training image, an MRI image that corresponds to a reconstruction of under-sampled MRI training data;
- determine a loss between the predicted MRI image and a ground truth image reconstructed based on the under-sampled MRI training data; and
- adjust one or more parameters of the INN based on the determined loss.

\* \* \* \* \*